US009665642B2

(12) United States Patent
Heck

(10) Patent No.: US 9,665,642 B2
(45) Date of Patent: *May 30, 2017

(54) AUTOMATIC IDENTIFICATION OF DIGITAL CONTENT RELATED TO A BLOCK OF TEXT, SUCH AS A BLOG ENTRY

(71) Applicant: Getty Images, Inc., Seattle, WA (US)

(72) Inventor: Steven F. Heck, Seattle, WA (US)

(73) Assignee: Getty Images, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/987,668

(22) Filed: Jan. 4, 2016

(65) Prior Publication Data

US 2016/0253411 A1   Sep. 1, 2016

Related U.S. Application Data

(63) Continuation of application No. 14/171,997, filed on Feb. 4, 2014, now Pat. No. 9,229,992, which is a continuation of application No. 13/648,220, filed on Oct. 9, 2012, now Pat. No. 8,644,646, which is a continuation of application No. 11/849,872, filed on Sep. 4, 2007, now Pat. No. 8,285,082.

(60) Provisional application No. 60/841,902, filed on Sep. 1, 2006.

(51) Int. Cl.
*G06K 9/60* (2006.01)
*G06F 17/00* (2006.01)
*G06F 7/00* (2006.01)
*H04N 1/00* (2006.01)
*G06F 17/30* (2006.01)
*G06F 17/27* (2006.01)
*G06K 9/36* (2006.01)
*H04L 29/08* (2006.01)

(52) U.S. Cl.
CPC .... *G06F 17/30684* (2013.01); *G06F 17/2765* (2013.01); *G06F 17/30253* (2013.01); *G06F 17/30554* (2013.01); *G06F 17/30696* (2013.01); *G06F 17/30707* (2013.01); *G06K 9/36* (2013.01); *H04L 67/02* (2013.01)

(58) Field of Classification Search
None
See application file for complete search history.

*Primary Examiner* — Randolph I Chu
(74) *Attorney, Agent, or Firm* — Perkins Coie LLP

(57) ABSTRACT

A system for identifying digital content related to a portion of a block of text receives, automatically or via input by a user, an indication of one or more words included in the block of text. The system searches a database of digital content based on the one or more words and retrieves from the database one or more digital content items or identifiers of digital content items that are related to the one or more words. The system provides the retrieved digital content items or identifiers to the user, and receives a selection of one or more of the provided items or identifiers from the user. The system associates for display or replay the one or more selected digital content items with the one or more words in the block of text. Other embodiments of the system are also disclosed.

15 Claims, 13 Drawing Sheets

🖼 Have Stock - 5/26/2006 4:13:57 PM

Texan ran for vice president in 1988

Tuesday, May 23, 2006; Posted: 4:52 p.m. EDT (20:52 GMT) Tuesday, May 23, 2006; Posted: 4:52 p.m. EDT (20:52 GMT)

U.S. Treasury Secretary Lloyd Bentsen is shown with President Clinton in 1994.

-- Lloyd Bentsen, a former congressman, senator and treasury secretary, is dead, his family told CNN on Tuesday.

The 85-year-old Texan died of natural causes at 8:45 a.m. (9:45 a.m. ET) at his home in Houston surrounded by family, son Lan Bentsen said.

Bentsen had been in poor health since suffering a stroke in 1999, his son said.

Bentsen served as President Clinton's first treasury secretary. (Gallery: Lloyd Bentsen 1921-2006)

As the Democratic 1988 vice presidential nominee, Bentsen was perhaps best known for his curt dismissal during a debate against Republican candidate Dan Quayle, who had compared himself to former President John Kennedy.

"Senator, I served with Jack Kennedy," Bentsen said. "I knew Jack Kennedy. Jack Kennedy was a friend of mine. Senator, you're no Jack Kennedy."

Bentsen returned home from service in World War II and entered politics in the late 1940s.

His pro-business, hawkish military views matched those of his Texas constituents and much of the nation.

But, after being elected to Congress in 1949, he left government in 1955, saying he could not raise his family on the $12,500 salary.

He started an insurance company and a consulting business, and became a millionaire.

During the 1950s and 1960s, he served as a major behind-the-scenes force in the rough-and-tumble world of Texas politics.

Once his children were grown, a financially secure Bentsen re-entered elective politics in 1970, defeating in the primary incumbent Sen. Ralph Yarborough, who party insiders deemed too liberal.

*FIG. 10*

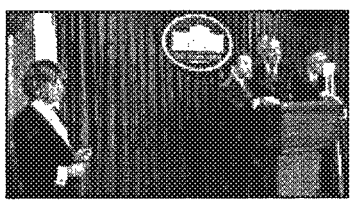
*FIG. 11* gettyimages* labs    iMarkup Demo

Lloyd Bentsen Dies at 85

Texan ran for vice president in 1988

Tuesday, May 23, 2006; Posted: 4:52 p.m. EDT (20:52 GMT)
Tuesday, May 23, 2006; Posted: 4:52 p.m. EDT (20:52 GMT)
Tuesday, May 23, 2006; Posted: 4:52 p.m. EDT (20:52 GMT)

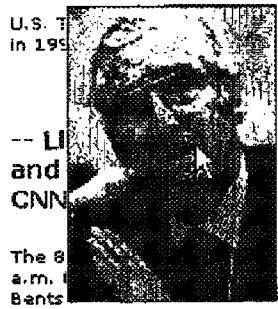

U.S. ... d Bentsen is shown with President Clinton
in 199...

-- L... ormer congressman, senator
and ... ry, is dead, his family told
CNN...

The 8... of natural causes at 8:45 a.m. (9:45
a.m. ... ston surrounded by family, son Lan
Bents...

Bentsen had been in poor health since suffering a stroke in 1999, his son said.

Bentsen served as President Clinton's first treasury secretary.
(Gallery: Lloyd Bentsen 1921-2006)

As the Democratic 1988 vice presidential nominee, Bentsen was perhaps best known for his curt dismissal during a debate against Republican candidate Dan Quayle, who had compared himself to former President John Kennedy.

"Senator, I served with Jack Kennedy," Bentsen said. "I knew Jack Kennedy. Jack Kennedy was a friend of mine. Senator, you're no Jack Kennedy."

*FIG. 13*

AUTOMATIC IDENTIFICATION OF DIGITAL CONTENT RELATED TO A BLOCK OF TEXT, SUCH AS A BLOG ENTRY

CROSS-REFERENCE TO RELATED APPLICATION(S)

This application is a Continuation Application of U.S. patent application Ser. No. 14/171,997, entitled "AUTOMATIC IDENTIFICATION OF DIGITAL CONTENT RELATED TO A BLOCK OF TEXT, SUCH AS A BLOG ENTRY," filed on Feb. 4, 2014, which is a Continuation Application of U.S. patent application Ser. No. 13/648,220 (now U.S. Pat. No. 8,644,646), entitled "AUTOMATIC IDENTIFICATION OF DIGITAL CONTENT RELATED TO A BLOCK OF TEXT, SUCH AS A BLOG ENTRY," filed on Oct. 9, 2012, which is a Continuation Application of U.S. patent application Ser. No. 11/849,872 (now U.S. Pat. No. 8,285,082), entitled "AUTOMATIC IDENTIFICATION OF DIGITAL CONTENT RELATED TO A BLOCK OF TEXT, SUCH AS A BLOG ENTRY," filed on Sep. 4, 2007, which claims priority to U.S. Provisional Application No. 60/841,902, entitled "AUTOMATIC IDENTIFICATION OF IMAGES FOR A BLOCK OF TEXT, SUCH AS FOR A BLOG ENTRY," filed on Sep. 1, 2006, all of which are incorporated by reference in their entireties.

BACKGROUND

It has been said that a picture is worth a thousand words. Images have a special ability to evoke emotions, attract attention, and convey a message. As a reflection of this, most modern written communication has a graphical component, and often this graphical component includes photographic images. Contemporary commercial web sites, for example, make liberal use of images. As a result, commercial web sites often have customary sources for obtaining images, whether these sources are internal, such as staff photographers, or external, such as image licensing services, including Getty Images.

While much of the content available online is provided by commercial web sites, many private individuals also create content and share it online. Some people host web sites on which they share their research, opinions, and even information about their personal lives. Other people have public web journals to which they periodically add entries. One type of online web journal is a "blog," or web log.

Blogs may contain text only, or they may also include images. If an individual wants to write a blog entry about Machu Picchu, for example, he may start with text, but may find that including pictures of this region will not only better illustrate its amazing beauty, but may also attract more readers to his blog. Another individual who wants to blog (i.e., write a blog entry) about a notable political figure may want to include a picture so that a reader can see the person who is the subject of the blog entry. Readers may find that a story included in a blog is more interesting to read if there are pictures associated with the story.

BRIEF DESCRIPTION OF THE DRAWINGS

FIG. 10 is a display diagram illustrating how the system indicates to an authoring user the words or phrases for which relevant images are available in some embodiments.

FIG. 11 is a display diagram illustrating how the system allows an authoring user to select from among relevant images identified and displayed by the system in some embodiments.

FIG. 13 is a display diagram illustrating how the system displays to a reading user an image associated with a word or phrase in some embodiments.

DETAILED DESCRIPTION

Figure 1:
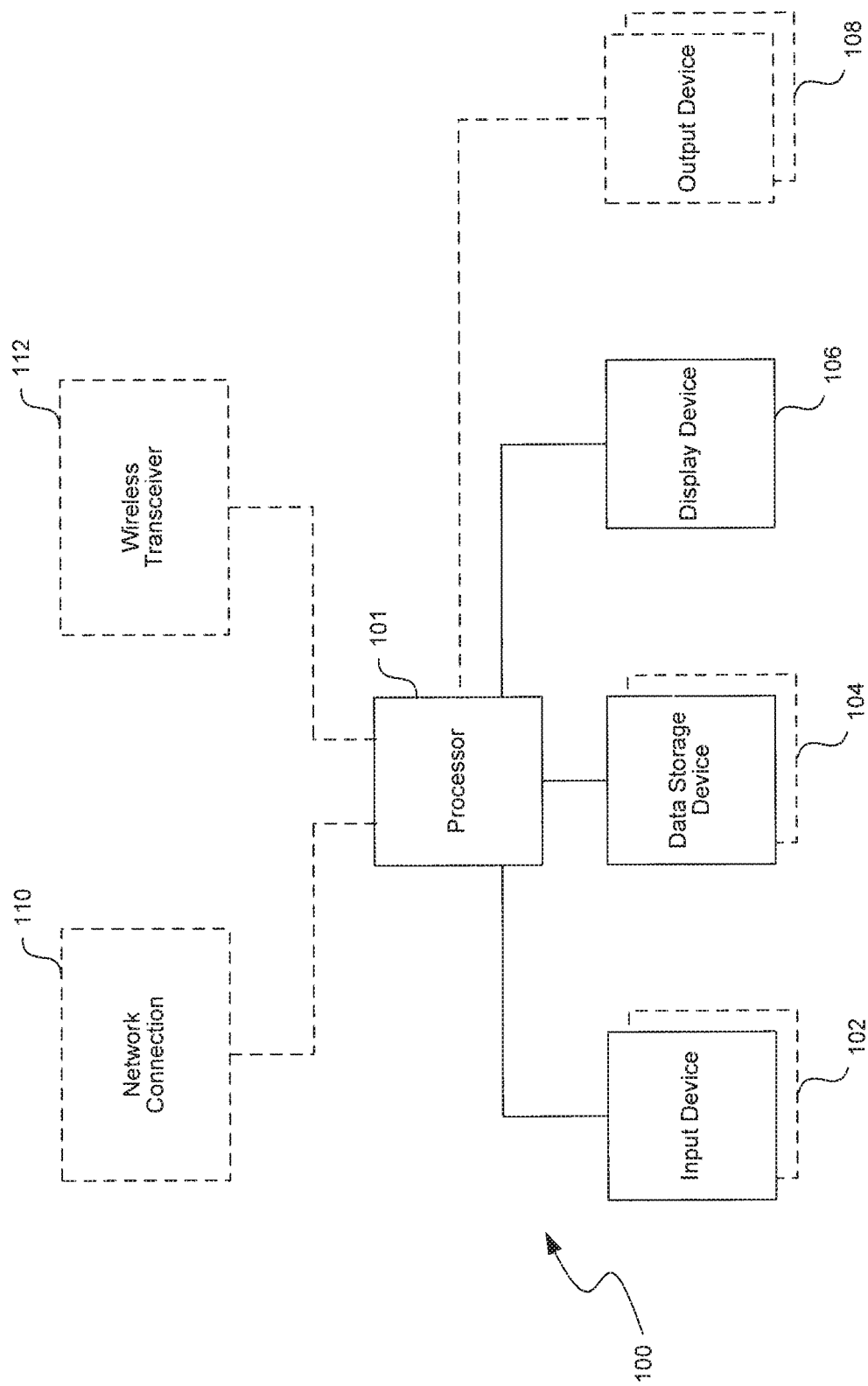
FIG. 1 is a block diagram of a basic and suitable computer that may employ aspects of the invention.

While a commercial web site is likely to be maintained by someone who is aware of the types of images that are available and is likely to have sources for obtaining images, a private individual or a small business may not find it feasible to search for images to include on a web site. Additionally, it can be costly and time-consuming to negotiate a license to use an image. Even if it were feasible to find and license an image, an individual or small business may not think it is likely that a relevant image, such as one that corresponds to a specific word or phrase, is even available. It would be time-consuming to manually search a web site phrase-by-phrase to determine which words or phrases may be associated with relevant images. These and other problems exist.

A system for identifying digital content related to a portion of a block of text is disclosed. The system receives, automatically or via input by a user, an indication of one or more words included in the block of text for which related digital content is to be identified. The system searches a database of digital content based on the one or more words and retrieves from the database one or more digital content items or identifiers of digital content items that are related to the one or more words. The system provides the retrieved digital content items or identifiers to the user, and receives a selection of one or more of the provided digital content items from the user. The system associates for display or replay the one or more selected digital content items with the one or more words in the block of text. Other embodiments of the system are also disclosed.

The system disclosed herein has many benefits, including informing web site authors of available images relevant to web site text and making it easier for authors to license and associate those images with the text. The system provides these and other advantages.

A brief example of how the system may be used will guide the reader in understanding the description and figures that follow. Imagine a user May Bloghappy who writes a blog about her trips to various parts of the world. She thinks that her blog entries are more interesting when they include attractive images. As a result, May subscribes to a blogging service that gives its subscribers access to thousands of quality images.

Since May is interested in travel, she subscribes to a service that offers "international" images. If she has other interests, she might also subscribe to a "sports" or "news" image database. However, even within the international images database, there are too many images for May to sort through by herself. Instead, while writing her newest blog entry, she can request that the blog service choose a few relevant images for her based on the content of her blog entry and the relevancy, recency, or popularity of the images. This saves her the trouble of trying to find a few relevant images among the many thousands or millions of images that are available in the international images database.

The process starts when May, while writing her blog entry, requests that the blog service search for a few images related to her blog entry. The blog service processes the text of May's blog entry and makes a list of words and/or phrases that will be used to look for images. The system uses this list of words and/or phrases to search a catalog of images to find a few images that are related to each word or phrase on the list. The system displays the relevant images, and May can choose one or more of these images to associate with the words or phrases in her blog entry. A reader of May's blog can read her text and see the images she has chosen.

In some embodiments, if any of the words or phrases identified by the system have multiple meanings, the system may display a visual indication to allow May to determine which meaning is the one she intended. For example, if she used the word "Bush" at the start of a sentence in her blog, the system might provide a visual indication that one set of images is related to "President Bush" and another set of images is related to shrubbery. When May selects the visual indication for the political figure, she indicates to the facility that she wants to choose a picture of the President. As a result of this selection, she may then be presented with a group of images from which to choose.

While the following description contains specific details to provide an enabling understanding of a few sample embodiments of the system, one skilled in the art will understand that the invention may be practiced in many additional or alternative embodiments that may differ in details from the sample embodiments described. Additionally, some well-known structures or functions may not be shown or described in detail, so as to avoid unnecessarily obscuring the relevant description of the various embodiments.

The terminology used in this Detailed Description is intended to be interpreted in its broadest reasonable manner, even though it is used in conjunction with a detailed description of certain specific embodiments of the invention. Certain terms may even be emphasized below; however, any terminology intended to be interpreted in a restricted manner will be overtly and specifically defined as such in this Detailed Description section.

In the drawings, the same reference numbers and acronyms identify elements or acts with the same or similar functionality for ease of understanding and convenience. To easily identify the discussion of any particular element or act, the most significant digit or digits in a reference number refer to the Figure number in which that element is first introduced (e.g., element 504 is first introduced and discussed with respect to FIG. 5).

FIG. 1 and the following discussion provide a brief, general description of a suitable computing environment in which aspects of the invention can be implemented. Although not required, aspects and embodiments of the invention will be described in the general context of computer-executable instructions, such as routines executed by a general-purpose computer, e.g., a server or personal computer. Those skilled in the relevant art will appreciate that the invention can be practiced with other computer system configurations, including Internet appliances, hand-held devices, wearable computers, cellular or mobile phones, multi-processor systems, microprocessor-based or programmable consumer electronics, set-top boxes, network PCs, mini-computers, mainframe computers, and the like. The invention can be embodied in a special purpose computer or data processor that is specifically programmed, configured or constructed to perform one or more of the computer-executable instructions explained in detail below. Indeed, the term "computer," as used generally herein, refers to any of the above devices, as well as any data processor.

The invention can also be practiced in distributed computing environments, where tasks or modules are performed by remote processing devices, which are linked through a communications network, such as a Local Area Network ("LAN"), Wide Area Network ("WAN"), or the Internet. In a distributed computing environment, program modules or sub-routines may be located in both local and remote memory storage devices. Aspects of the invention described below may be stored or distributed on computer-readable media, including magnetic and optically readable and removable computer discs, stored as firmware in chips (e.g., EEPROM chips), as well as distributed electronically over the Internet or over other networks (including wireless networks). Those skilled in the relevant art will recognize that portions of the invention may reside on a server computer, while corresponding portions may reside on a client computer. Data structures and transmission of data particular to aspects of the invention are also encompassed within the scope of the invention.

Referring to FIG. 1, one embodiment of the invention employs a computer 100, such as a personal computer or workstation, having one or more processors 101 coupled to one or more user input devices 102 and data storage devices 104. The computer is also coupled to at least one output device such as a display device 106 and one or more optional additional output devices 108 (e.g., printer, plotter, speakers, tactile or olfactory output devices, etc.). The computer may be coupled to external computers, such as via an optional network connection 110, a wireless transceiver 112, or both.

The input devices 102 may include a keyboard and/or a pointing device such as a mouse. Other input devices are possible such as a microphone, joystick, pen, game pad, scanner, digital camera, video camera, and the like. The data storage devices 104 may include any type of computer-readable media that can store data accessible by the computer 100, such as magnetic hard and floppy disk drives, optical disk drives, magnetic cassettes, tape drives, flash memory cards, digital video disks (DVDs), CD-ROMs, Bernoulli cartridges, RAMs, ROMs, smart cards, etc. Indeed, any physical medium for storing or transmitting computer-readable instructions and data may be employed, including a connection port to or node on a network such as a local area network (LAN), wide area network (WAN) or the Internet (not shown in FIG. 1).

Figure 2:
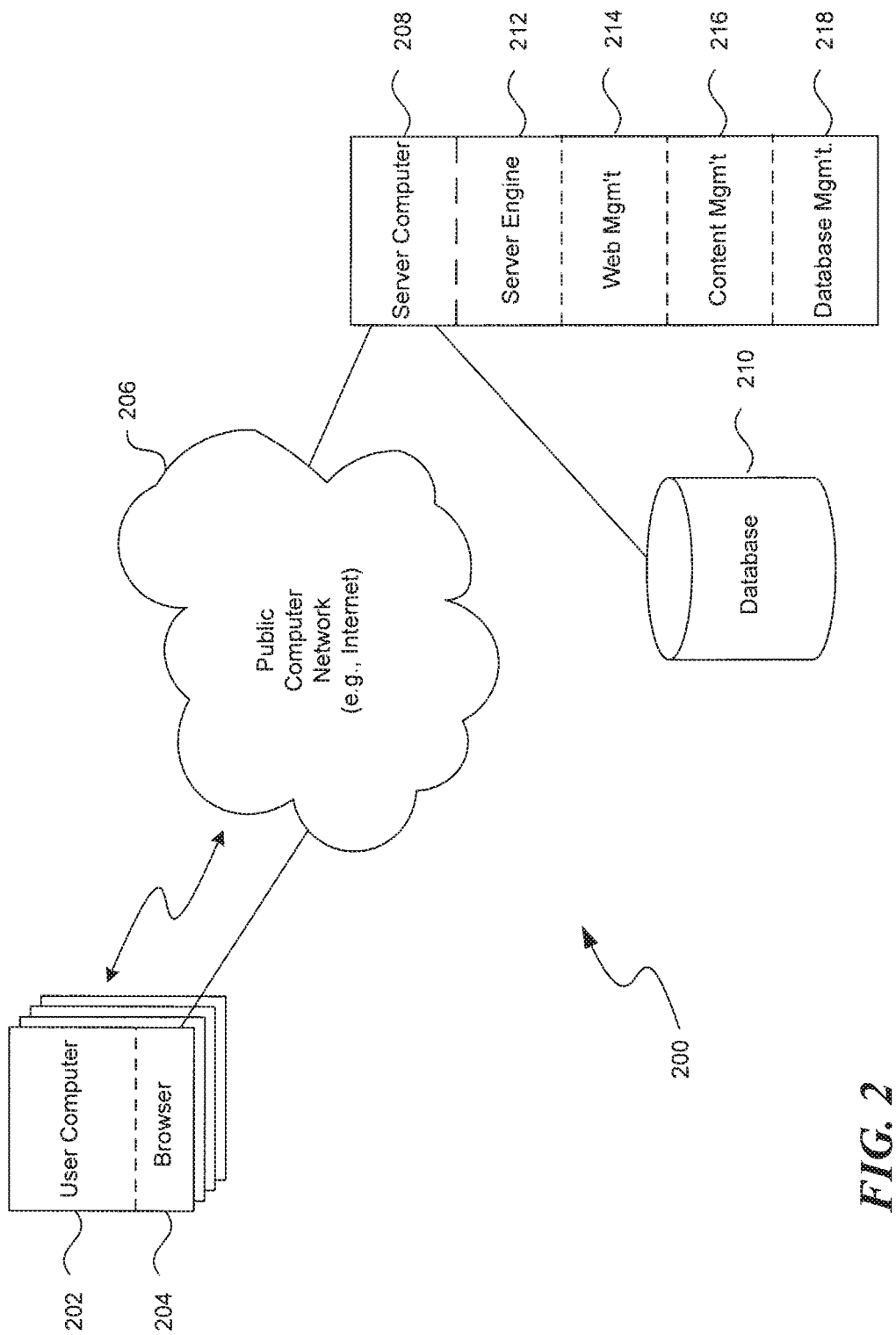
FIG. 2 is a block diagram illustrating a simple, yet suitable system in which aspects of the invention may operate in a networked computer environment.

Aspects of the invention may be practiced in a variety of other computing environments. For example, referring to FIG. 2, a distributed computing environment with a web interface that includes one or more user computers 202 in a system 200 is shown; each computer 202 includes a browser program module 204 that permits the computer to access and exchange data with the Internet 206, including web sites within the World Wide Web portion of the Internet. The user computers may be substantially similar to the computer described above with respect to FIG. 1. User computers may include other program modules such as an operating system, one or more application programs (e.g., word processing or spread sheet applications), and the like. The computers may be general-purpose devices that can be programmed to run various types of applications, or they may be single-purpose devices optimized or limited to a particular function or class of functions. More importantly, while shown with web browsers, any application program for providing a graphical user interface to users may be employed, as described in detail below; the use of a web browser and web interface are only used as a familiar example here.

At least one server computer 208, coupled to the Internet or World Wide Web ("Web") 206, performs many or all of the functions for receiving, routing, and storing of electronic messages, such as web pages, audio signals, and electronic images. While the Internet is shown, a private network, such as an intranet, may indeed be preferred in some applications. The network may have a client-server architecture, in which a computer is dedicated to serving other client computers, or it may have another architecture such as a peer-to-peer network, in which one or more computers serve simultaneously as servers and clients. A database 210 or databases, coupled to the server computer(s), stores much of the content and web pages exchanged between the user computers. The server computer(s), including the database(s), may employ security measures to inhibit malicious attacks on the system, and preserve the integrity of the messages and data stored therein (e.g., firewall systems, secure socket layers (SSL), password protection schemes, encryption, and the like).

The server computer 208 may include a server engine 212, a web page management component 214, a content management component 216, and a database management component 218. The server engine performs basic processing and operating system level tasks. The web page management component handles creation and display or routing of web pages. Users may access the server computer by means of a URL associated therewith. The content management component handles most of the functions in the embodiments described herein. The database management component includes storage and retrieval tasks with respect to the database, queries to the database, and storage of data such as video, graphics and audio signals.

While the applicant's technology may be practiced using a number of different possible embodiments, only a few explanatory embodiments will be discussed here.

In some embodiments, an authoring user enters a block of text, views indications of words or phrases in the block of text for which there are relevant images, makes selections of images that are to be associated with the indicated text, and views the text block along with the associated images.

In some embodiments, the system segments the block of text submitted by the authoring user into usable words or groups of words (i.e., "segments"), filters the identified segments to select those that are most likely to have relevant images, and sends to the authoring user information about images related to the words or phrases corresponding to the filtered segments.

In some embodiments, after identifying segments for which there may be relevant images, the system searches a database for each of the segments to identify images relevant to that segment. The system may then associate one or more images from the search results with the appropriate word or phrase in the blog entry. In some embodiments, the system returns the blog entry to the authoring user along with markup information that identifies any relevant images identified by the system. In some embodiments, the system provides a visual indication on the words or phrases for which relevant images have been identified. The images may be ranked to assist users in selecting the best images; images may, for example, be ranked by their popularity. The authoring user can then browse the supplied images and select one or more images to associate with a corresponding word or phrase. In some embodiments, when the user finalizes the blog entry, the system sends the blog entry along with the associated image choices to a blogging service for publication.

Readers of a blog entry will be able to read the author's text as usual. In addition, readers will also be able to view images associated with the text. In some embodiments, the system displays to a reader a visual indication, such as highlighted text, that identifies words and phrases for which images have been associated. In some embodiments, when a word or phrase is selected by a reader (e.g., by clicking, mouse hover, or other user action) the system displays the image or images that were earlier selected by the author. Alternatively or additionally, the system may display the blog so that the text flows around the associated images. In such embodiments, the reader is not required to take any additional action to view the images.

In some embodiments, the system includes both a client and a server. These embodiments might comprise, for example, a web browser and a web server, a custom client application and an online service, or a combination of these and other examples. Other embodiments of the system may include only a server, such as an online service that is provided to other web sites. Still other embodiments of the system may include only a client, such as an application that is downloadable or available on a computer readable medium such as a CD-ROM or a DVD.

Figure 3:
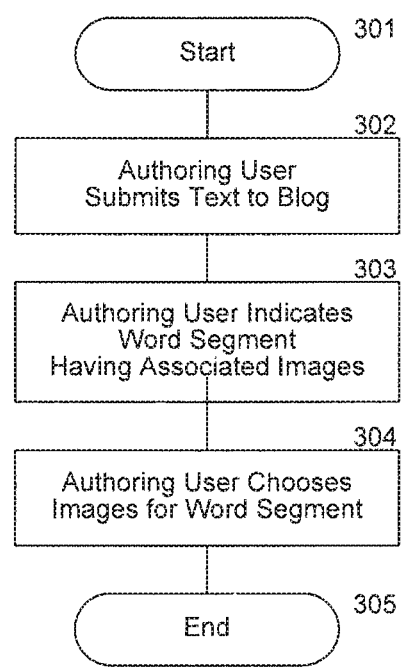
FIG. 3 is a flow chart illustrating a process by which an authoring user may select images for a block of text in some embodiments.

FIG. 3 is a flow chart illustrating a process by which an authoring user may select images for a block of text in some embodiments. At a block 302, an authoring user creates a blog entry and submits the entry to an online blog service. In some embodiments, a client application is designed to allow a user enter, edit, and format a block of text before submitting it to the system. In some embodiments, the client application may be a web browser, while in other embodiments it may be another type of application. In some embodiments, the client application sends the text of the blog entry to an online service that identifies images that are related to words or phrases in the blog entry.

After the service has identified relevant images, it provides the authoring user with information about those images. In some embodiments, the client application displays to the authoring user the text of the blog entry and a visual indication of the words and phrases for which relevant images may be selected. FIG. 10 is an example of a user interface used by the system to display to an authoring user visual indications of the words or phrases for which relevant images are available. In this example, the authoring user has submitted text about Lloyd Bentsen, which is displayed by the system together with highlighting that indicates the words and phrases with which images may be associated. In this example, the words and phrases identified as corresponding to available images include "Lloyd Bentsen," "President Clinton," "Dan Quayle," "John Kennedy," "Jack Kennedy," "War," and "party."

Returning to FIG. 3, at a block 303 the authoring user selects a highlighted word or phrase with which she would like to associate an image. The user may select a word or phrase by, for example, clicking on a word or phrase. In response to the authoring user's selection, the system displays one or more images relevant to the selected word or phrase. FIG. 11 is an example of a user interface used by the system to display one or more images to the authoring user. In this example, the system displays images related to the selected phrase "Lloyd Bentsen."

Figure 12:
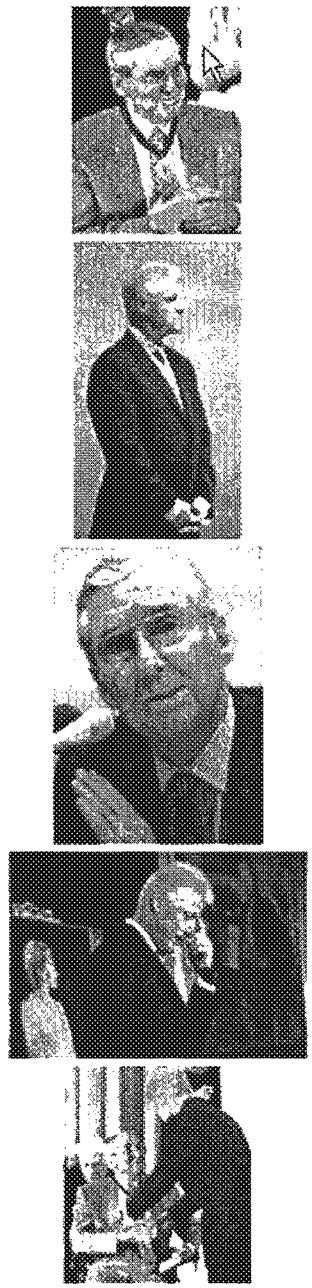
FIG. 12 is a display diagram illustrating how the system displays to an authoring user the set of images selected by the user to be associated with a block of text in some embodiments.

The process illustrated in FIG. 3 may be repeated for several words and/or phrases, such that one or more images will be associated with each word or phrase selected by the authoring user. FIG. 12 is an example of a user interface used by the system to display to the authoring user the set of images selected by the user; each image is associated with a word or phrase selected by the user.

Figure 5:
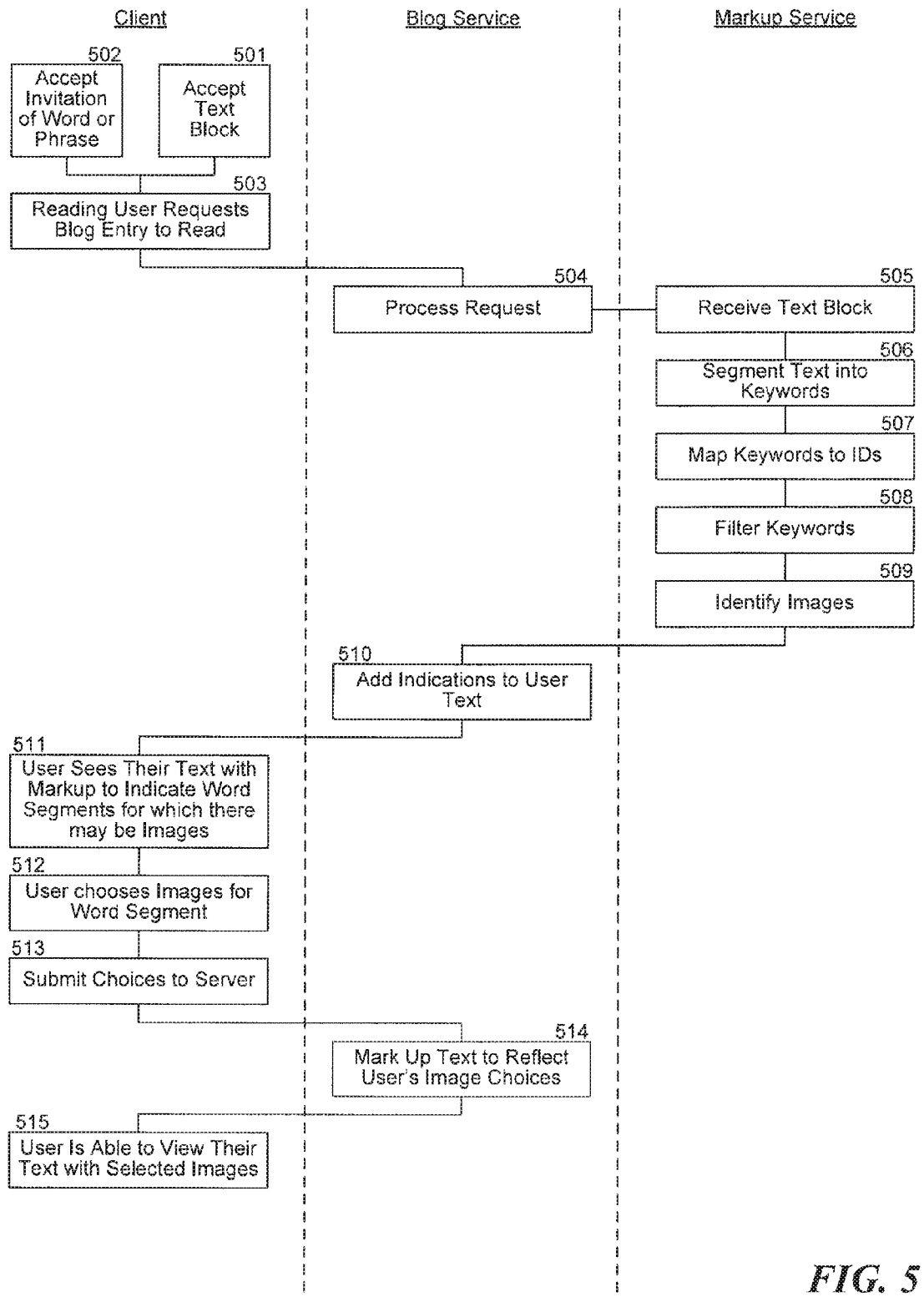
FIG. 5 is a more detailed flow chart of a process by which an authoring user may select images for a block of text in some embodiments.

FIG. 5 is a more detailed flow chart of a process by which an authoring user may select images for a block of text in some embodiments. FIG. 5 provides more detail of the process described in FIG. 3. The process begins at either a block 501, when an authoring user submits a text block for processing, or at a block 502, when an authoring user manually selects a word, phrase, or other portion of the text block for processing.

While users will often make a request of the system with an entire block of text, as indicated by block 501, users may also manually identify a word or phrase within a block of text for which the system is to search for relevant images, as indicated by block 502. This may be useful, for example, if the segmenting process of the online service does not identify a phrase the user would like to associate with an image. For example, if the segmenting functionality identified "white" and "house" as separate segments, the user might manually request that the service search for images related to the segment "White House."

At a block 503 the authoring user requests that a blog service process the submitted text. The authoring user may make such request by means of a client application, such as a web browser. At a block 504 the blog service receives and processes the request. To process the request, at a block 505 the blog service makes a request to markup service which receives the text. Upon receiving the text, at a block 506 the markup service calls a segmentation service to segment the received text into keywords. Optionally, at a block 507 the markup service may specify that the segmentation service should utilize a mapping service. If utilized, the mapping service receives the segments from the segmentation service, maps the segments to keyword categories, and returns the keyword categories to segmentation service. Segments and keyword categories are returned to markup service. If a mapping service is not utilized, the segmentation service returns the segments to the markup service without keyword categories.

After receiving the segments, at a block 508 the markup service calls a filtering service to filter the keywords. The markup service sends the filtering service the segmented text and, if applicable, the keyword categories. The filtering service identifies segments for which related images are most likely to be available. This process may involve the use of technologies such as those disclosed in U.S. patent application Ser. No. 11/449,380, filed Jun. 7, 2006, which is herein incorporated by reference in its entirety. Those segments for which related images are most likely to be available are returned as filtered keywords to markup service.

At a block 509, after receiving the filtered keywords, the markup service calls an asset service to search for images that are related to the keywords or keyword categories. The asset service searches for images and returns the identified images to the markup service. After receiving the images from the asset service, the markup service may do additional processing; for example, it may put the information about the identified images into a format that can be read by the blog service.

At a block 510 the blog service receives information about the identified images from the markup service and does further processing so that the appropriate words and phrases are indicated as having associated images. In some embodiments, the blog service stores the authoring user's text together with the image markup, while in other embodiments, the blog service stores the text separately from the image markup.

At a block 511 the system displays to the authoring user the words and phrases that have images available for selection. As indicated above, FIG. 10 is an example of a user interface used by the system to display to an authoring user visual indications of the words or phrases for which relevant images are available. Upon selecting one of the indicated words or phrases, at a block 512 the authoring user may choose one or more images to associate with the selected word or phrase. At a block 513 the user submits his image choices to the blog service. In some embodiments, a client application may make a request to the online service for each image the user associates with a word or phrase. In other embodiments, the client application may batch several such image selections into a single request.

At a block 514, when the blog service receives the authoring user's selection of an image for a word or phrase, the blog service updates the blog entry. At a block 515 the blog service displays to the authoring user the blog entry with the associated images.

Figure 7:
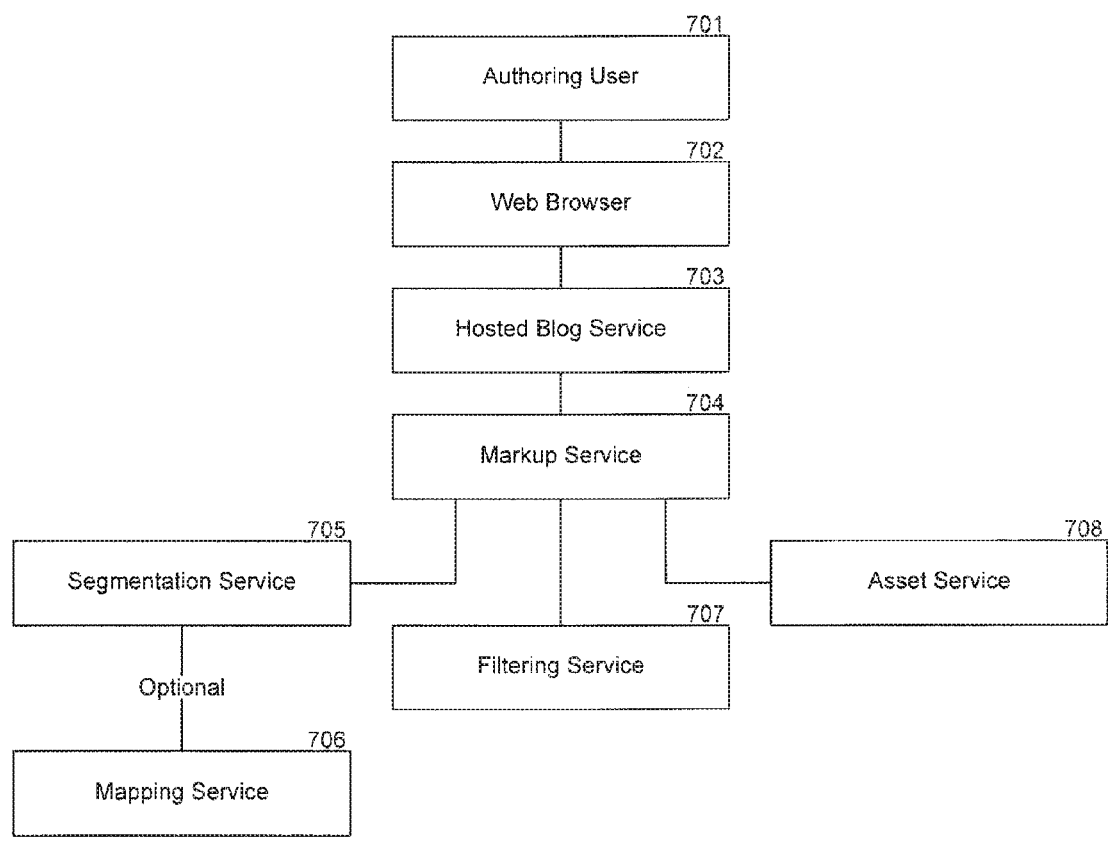
FIG. 7 is a block diagram illustrating a suitable system for identifying images relevant to a block of text.

FIG. 7 is a block diagram illustrating a suitable system for identifying images relevant to a block of text. Authoring user 701 uses a web browser 702 to interact with a hosted blogging service 703. Web browser 702 may be any of a variety of publicly available web browsers including Internet Explorer by Microsoft, Opera by Opera Software, or Firefox from Mozilla Corporation. The authoring user 701 creates a blog entry via the blogging service 703, which has licensed the system disclosed herein. The blogging service then sends the text of the blog entry to a markup service 704, which is an online service portion of the system. The markup service 704, after doing some initial processing of the text, sends the text to a segmentation service 705, which removes noise words and breaks the text into segments, which comprise phrases or individual words.

Optionally, the markup service 704 may request the segmentation service 705 to identify keyword category IDs for each of the identified segments. In some embodiments, the segmentation service 705 may use a mapping service 706 to map segments to keyword categories. In other embodiments, another component of the markup service 704, other than the segmentation service, simply returns a list of keyword category IDs for a block of text.

Upon receiving the segments and, if applicable, the keyword category IDs from the segmentation service 705, the markup service 704 may do additional processing. Upon completion of any additional processing, the markup service makes a request to a filtering service 707. The request contains, among other things, the segments returned by the segmentation service. The filtering service 707 removes segments that are less likely to result in finding images. The filtering service 707 may reduce the load on an asset service 708 and allow isolation of this functionality. When the markup service 704 receives the filtered keywords from the filtering service 707, it may do additional processing. The markup service 704 sends to the asset service 708 the filtered keywords, keyword category IDs, and/or and other information.

The asset service 708 identifies appropriate images for the filtered keywords and/or keyword category IDs and returns information about these images to the markup service 704. After some additional processing, the markup service 704 returns this information to the hosted blog service 703 in a format that can be used by the service. The blog service 703 will display to the authoring user 701 visual indications on words and phrases that have associated images. As indicated above, FIG. 10 is an example of a user interface used by the system to display to an authoring user visual indications of the words or phrases for which relevant images are available.

Figure 4:
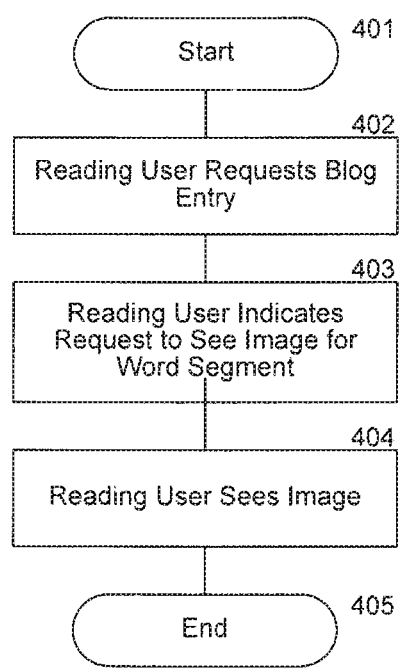
FIG. 4 is a flow chart illustrating a process by which a reading user may view images associated with a block of text in some embodiments.

FIG. 4 is a flow chart illustrating a process by which a reading user may view images associated with a block of text in some embodiments. As used generally herein, a reading user may be the same user as an authoring user, or the reading user may be a different user than the authoring user.

At a block 402 a reading user requests a blog entry to read. In some embodiments, the system displays the blog entry to the reading user along with a visual indication of words or phrases for which there are associated images. At a block 403 the reading user requests to view an image associated with a word or phrase. The reader may make her request in a number of different ways, such as by clicking on, bringing a mouse cursor to hover over, or taking another user action in association with a highlighted word or phrase. As a result of the reader's request, at a block 404 the client application requests the image from the online service and displays the image to the reader. FIG. 13 is an example of a user interface used by the system to display an image to a reading user. In this example, the reader has hovered over the phrase "Lloyd Bentsen." This phrase is highlighted to indicate that there is an image associated with the phrase. As a result of the user's request (e.g., hover indication), an image is displayed using techniques known to those skilled in the art.

Figure 6:
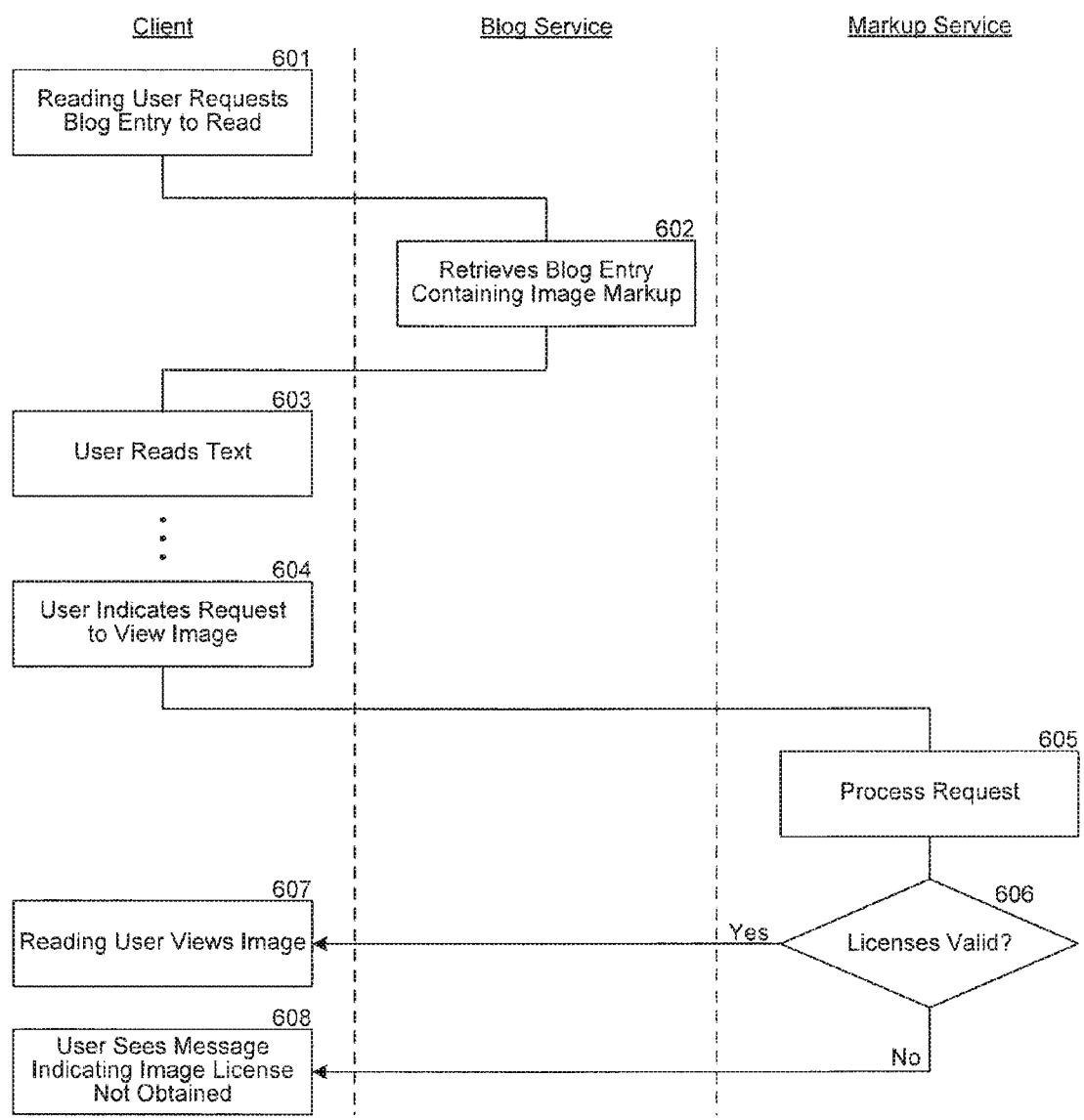
FIG. 6 is a more detailed flow chart of a process by which a reading user may view images associated with a block of text in some embodiments.

FIG. 6 is a more detailed flow chart of a process by which a reading user may view images associated with a block of text in some embodiments. FIG. 6 provides more detail of the process illustrated in FIG. 4.

At a block 601 a reading user requests a blog entry to read. At a block 602 the blog service displays the blog entry containing image markup, which may include visual indications on words and phrases to inform the user there is at least one image associated with the corresponding word or phrase. At a block 603 the reading user views the words or phrases that are highlighted to indicate that there are one or more associated images. At a block 604 the user indicates a request via a client application, such as a web browser, to a delivery service for the associated images.

At a block 605 the delivery service receives the image request, and at a block 606 the delivery service determines whether the URL of the image request is valid. In addition, the delivery service may perform other processing. The delivery service calls an image service to display images to the reading user. If the URL is valid, at a block 607 the image service displays the image to the reading user. If the URL is not valid, at a block 608 the image service displays to the reading user an indication that the URL is not valid. If embedded URLs (i.e., uniform resource locators) are used to associate images with text, these URLs may optionally include encrypted text to prevent readers from reverse-engineering of URLs, for example, to obtain access to images they have not licensed.

Figure 8:
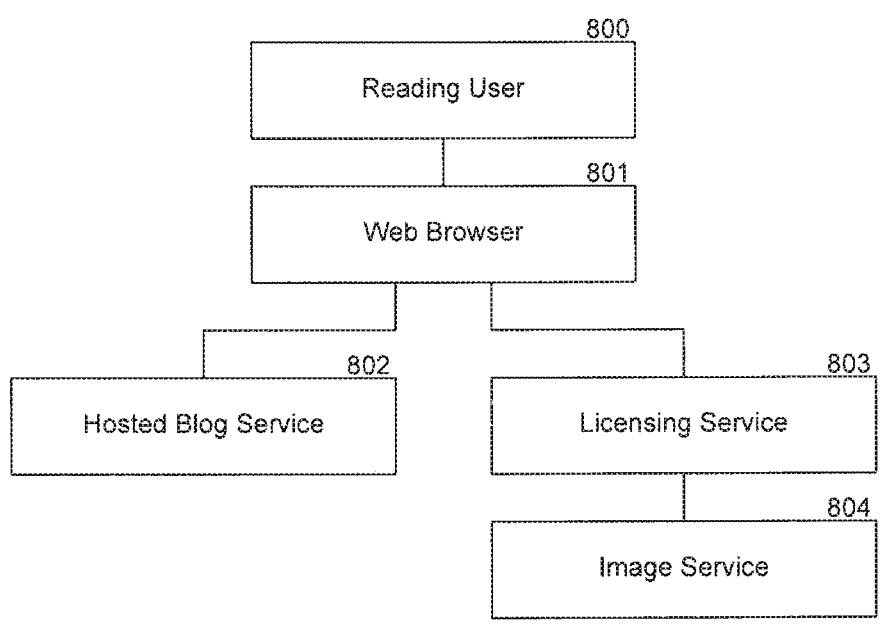
FIG. 8 is a block diagram illustrating a suitable system for displaying to a reader images associated with text.

FIG. 8 is a block diagram illustrating a suitable system for displaying images associated with text to a reading user. As described in reference to FIG. 6, a reading user 800 makes a request for a blog entry through a client application, such as a web browser 801, to a blog service 802. Upon reading the requested blog entry, the user 800 may request to see an image associated with a word or phrase. In some embodiments, this request goes to a licensing service 803 which determines whether a valid license has been obtained for this viewing of the image. The licensing service 803 may verify the existence of a valid license via a variety of mechanisms. If there is a valid license, an image service 804 displays the image to the reader. If there is not a valid license, the image service 804 displays to the reader an indication that the image could not be supplied. In some embodiments, the image service may display the indication as an image of an appropriate size containing text describing the error.

Figure 9:
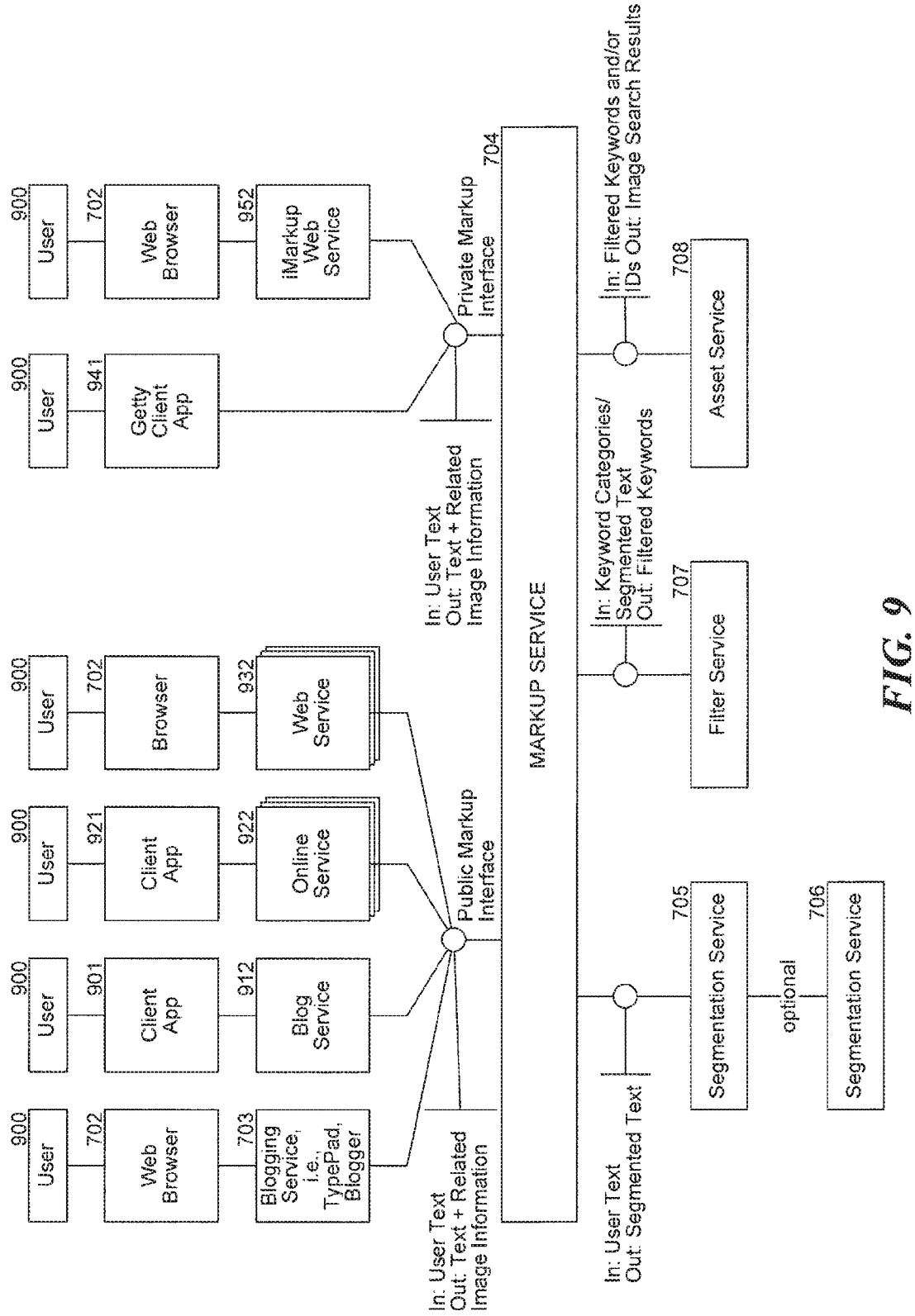
FIG. 9 is a block diagram illustrating a variety of embodiments in which the system may operate.

FIG. 9 is a block diagram illustrating a variety of embodiments in which the system may operate. This diagram illustrates just a small subset of system embodiments, and it is not intended to be exhaustive or comprehensive. Given the foregoing discussion, many of the embodiments illustrated in FIG. 9 will be readily understood by one skilled in the art. Some items worthy of note, however, are discussed in more detail.

User 900 may be an authoring user, a reading user, or both.

Block 912 is a blog service that works in combination with a specialized client application 901. The client application 901 may be provided by the blog service or by another entity.

Block 921 is a specialized client application that uses one or more online services 922. For the purposes of this application, an online service is a more general term than a web service, such as that represented by block 932. An online service may support SOAP, CORBA, and/or DCOM requests, and/or requests transmitted via another network protocol. Client application 921 may communicate with an online component of the system through one or more online services 922.

Block 932 is web service that responds to HTTP requests. Browser 702, as described above, is a web browser.

Online service 922 and web service 932 may be combined as a single service, or may be alternated through multiple services (for example, client 921 may call a web service 932 that calls an online service 922 that calls another online service 922 that calls an online service of the facility, such as markup service 704). One or more online services 922 and/or web services 932 may thus be combined in a single embodiment.

Block 941 represents a specialized client application written by an entity with permission to make direct calls to an online service of the facility. As described further below, greater permission and broader access to system functionality may be given to specialized client applications written by specifically authorized parties.

Block 952 represents a web service provided by an entity with permission to make direct calls to an online service of the facility. This web service may be provided by the applicant or a licensee, and may have broader access to functionality of the system than that given to parties that have not been authorized to use the private markup interface.

Offering an interface to be called by custom client software allows a potentially richer set of functionality to be provided to users. Custom client applications may, for example, be allowed to access functionality of the online service more directly or more flexibly, do additional processing of the information returned from the online service, or determine on their own whether and how to preset the returned information to a user. For example, if a licensee desires to write a custom client application that makes requests of the system and does additional processing on the returned information, the licensee's application may be permitted broader permissions or richer access to the facility than is usually available.

In some embodiments, the system may be practiced as an online service (i.e., "primary service provider") offered for use by a variety of clients, some of which may themselves be online services (i.e., "intermediary service providers"). Intermediary service providers may handle functions similar to those handled by client applications, as described above, and/or they may provide other unique system functionality. For example, an intermediary service provider may combine a response from a primary service provider with information returned from other online services into a single response to the requestor.

In some embodiments, the facility may be practiced in a client only environment, such as for users who do not have network access or prefer to work solely on their own computers.

While the explanatory embodiments are described in reference to a blog entry, the system disclosed herein can be used in a variety of other contexts such as a private web site, a commercial web site, email, web mail, a person-to-person chat application, and/or other authoring applications that include text that could be marked up or annotated to indicate an image association. For example, additional use contexts might be a social networking site such as MySpace, Orkut or Friendster. The disclosed technology could also be used in the context of an online publishing system (such as newspaper), an online news web site, or an online magazine. In addition, the disclosed technology may be used in the context of a publicly editable web site (also known as a "wiki").

In general, the Detailed Description of embodiments of the invention is not intended to be exhaustive or to limit the invention to any of the precise forms disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having blocks, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

Aspects of the invention may be stored or distributed on computer-readable media, including magnetically or optically readable computer discs, hard-wired or preprogrammed chips (e.g., EEPROM semiconductor chips), nanotechnology memory, biological memory, or other data storage media. Indeed, computer implemented instructions, data structures, screen displays, and other data under aspects of the invention may be distributed over the Internet or over other networks (including wireless networks), on a propagated signal on a propagation medium (e.g., an electromagnetic wave(s), a sound wave, etc.) over a period of time, or they may be provided on any analog or digital network (packet switched, circuit switched, or other scheme). Those skilled in the relevant art will recognize that portions of the invention reside on a server computer, while corresponding portions reside on a client computer such as a mobile or portable device, and thus, while certain hardware platforms are described herein, aspects of the invention are equally applicable to nodes on a network.

The teachings of the invention provided herein can be applied to other systems, not necessarily the system described herein. The elements and acts of the various embodiments described herein can be combined to provide further embodiments.

Any patents, applications, and other references, including any that may be listed in accompanying filing papers, are incorporated herein by reference, including commonly owned U.S. patent application Ser. No. 11/449,380, filed Jun. 7, 2006, titled "METHOD AND SYSTEM FOR CLASSIFYING MEDIA CONTENT."

Aspects of the invention can be modified, if necessary, to employ the systems, functions, and concepts of the various references described above to provide yet further embodiments of the invention.

These and other changes can be made to the invention in light of the above Detailed Description. While the above description details certain embodiments of the invention and describes the best mode contemplated, no matter how detailed the above appears in text, the invention can be practiced in many ways. Details of the invention may vary considerably in its implementation details, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms.

A portion of this disclosure contains material to which a claim for copyright is made. The copyright owner has no objection to the facsimile reproduction by anyone of the patent document or patent disclosure (including the Figures) as it appears in the Patent and Trademark Office patent file or records, but the copyright owner reserves all other copyright rights whatsoever.

While certain aspects of the invention are presented below in certain claim forms, the inventors contemplate the various aspects of the invention in any number of claim forms. For example, while only one aspect of the invention is recited as a means-plus-function claim under 35 U.S.C. §112, sixth paragraph, other aspects may likewise be embodied as a means-plus-function claim, or in other forms, such as being embodied in a computer-readable medium. (Any claims intended to be treated under 35 U.S.C. §112, ¶6 will begin with the words "means for.") Accordingly, the inventors reserve the right to add additional claims after filing the application to pursue such additional claim forms for other aspects of the invention.

I claim:

1. A method of identifying digital content related to a portion of a block of text, the method comprising:
   receiving a block of text for which related digital content is to be identified, wherein the digital content comprises still or moving digital images;
   providing the block of text to a computer-implemented service that:
      separates the block of text into one or more segments comprising phrases or individual words;
      searches a dataset of digital content based on the one or more segmented phrases or individual words to identify one or more digital content items related to the one or more segmented phrases or individual words; and
      retrieves from the dataset one or more digital content identifiers associated with the identified one or more digital content items;
   receiving, from the computer-implemented service, an indication of the segmented phrases or individual words for which the digital content identifiers were retrieved;
   receiving, from the computer-implemented service, the retrieved digital content identifiers;
   augmenting the block of text with visual indicators indicating the segmented phrases or individual words in the block of text for which a digital content identifier was retrieved;
   receiving a selection of one of the segmented phrases or individual words and presenting to a user digital content items associated with the digital content identifiers for the selected segmented phrase or individual word;
   receiving a selection of one or more of the presented digital content items from the user; and
   updating the block of text with the selected digital content items.

2. The method of claim 1, wherein the block of text comprises a web log.

3. The method of claim 1,
   wherein the segmented phrases or individual words for which the indication is received have multiple meanings;
   wherein the method further comprises:
      providing to the user a visual indication of the multiple meanings, and
      receiving from the user a selection of one of the multiple meanings; and
   wherein the presented one or more digital content items are further based on the selected one of the multiple meanings.

4. The method of claim 1, wherein searching a dataset of digital content further comprises:
   selecting the segments for which digital content is most likely to be available; and
   searching based on the selected segments.

5. The method of claim 1, wherein receiving a selection of one of the segmented phrases or individual words is based on detecting a hover indication or a click.

6. The method of claim 1, wherein the digital content identifiers are uniform resource locators (URLs).

7. The method of claim 1, wherein the visual indicators are highlighting.

8. The method of claim 1, wherein the digital content items are ranked based on which items are likely to be more relevant to the user, and wherein presenting the digital content items is based on the items' rankings.

9. A non-transitory computer-readable medium encoded with instructions for performing a method for identifying digital content related to a portion of a block of text, the method comprising:
   receiving a block of text for which related digital content is to be identified, wherein the digital content comprises still or moving digital images;
   providing the block of text to a computer-implemented service that:
      separates the block of text into one or more segments comprising phrases or individual words;
      searches a dataset of digital content based on the one or more segmented phrases or individual words to identify one or more digital content items related to the one or more segmented phrases or individual words; and
      retrieves from the dataset one or more digital content identifiers associated with the identified one or more digital content items;
   receiving, from the computer-implemented service, an indication of the segmented phrases or individual words for which the digital content identifiers were retrieved;
   receiving, from the computer-implemented service, the retrieved digital content identifiers;
   augmenting the block of text with visual indicators indicating the segmented phrases or individual words in the block of text for which a digital content identifier was retrieved;
   receiving a selection of one of the segmented phrases or individual words and presenting to a user the digital content items associated with the digital content identifiers for the selected segmented phrase or individual word;
   receiving a selection of one or more of the presented digital content items from the user; and
   updating the block of text with the selected digital content items.

10. The non-transitory computer-readable medium of claim 9, wherein the block of text comprises a web log.

11. The non-transitory computer-readable medium of claim 9,
   wherein the segmented phrases or individual words for which the indication is received have multiple meanings;
   wherein the method performed by the encoded instructions further comprises:
      providing to the user a visual indication of the multiple meanings, and
      receiving from the user a selection of one of the multiple meanings; and
   wherein the presented one or more digital content items are further based on the selected of one of the multiple meanings.

12. The non-transitory computer-readable medium of claim 9, wherein the visual indicators are highlighting.

13. The non-transitory computer-readable medium of claim 9, wherein the digital content identifiers are uniform resource locators (URLs).

14. The non-transitory computer-readable medium of claim 9, wherein the digital content items are ranked based on which items are likely to be more relevant to the user, and wherein presenting the digital content items is based on the items' rankings.

15. The non-transitory computer-readable medium of claim 9, wherein receiving a selection of one of the segmented phrases or individual words is based on detecting a hover indication or a click.

* * * * *